US010897984B2

(12) United States Patent
Roth et al.

(10) Patent No.: US 10,897,984 B2
(45) Date of Patent: Jan. 26, 2021

(54) SECURE DEVICE GRIP

(71) Applicant: NEBRO, LLC, Sunland Park, NM (US)

(72) Inventors: Jeffrey Roth, Sunland Park, NM (US); Christopher David McCoy, Oakland, CA (US)

(73) Assignee: NEBRO, LLC, Sunland Park, NM (US)

( * ) Notice: Subject to any disclaimer, the term of this patent is extended or adjusted under 35 U.S.C. 154(b) by 0 days.

(21) Appl. No.: 16/666,195

(22) Filed: Oct. 28, 2019

(65) Prior Publication Data

US 2020/0315329 A1 Oct. 8, 2020

Related U.S. Application Data

(60) Provisional application No. 62/831,082, filed on Apr. 8, 2019.

(51) Int. Cl.
| | |
|---|---|
| *F16M 13/00* | (2006.01) |
| *A45F 5/00* | (2006.01) |
| *A45C 11/00* | (2006.01) |
| *B60R 11/02* | (2006.01) |

(52) U.S. Cl.
CPC ............... *A45F 5/00* (2013.01); *A45C 11/00* (2013.01); *B60R 11/0241* (2013.01); *A45C 2011/002* (2013.01); *A45C 2011/003* (2013.01); *A45F 2200/0516* (2013.01); *A45F 2200/0525* (2013.01)

(58) Field of Classification Search
CPC .............. H04M 1/0281; F16M 13/00; B65D 2525/288; Y10T 16/4554; Y10T 403/32861; Y10T 403/32918; E05D 7/1077

USPC ................................................ 224/217–218
See application file for complete search history.

(56) References Cited

U.S. PATENT DOCUMENTS

| | | | | |
|---|---|---|---|---|
| 2,605,926 | A | * | 8/1952 | Casey ............... E05D 7/1077 220/840 |
| 3,426,384 | A | * | 2/1969 | Szabo ............... B65D 25/2826 16/405 |
| 3,438,467 | A | * | 4/1969 | Milette ............... A45C 13/26 16/405 |

(Continued)

FOREIGN PATENT DOCUMENTS

WO 2018187278 A1 10/2018

OTHER PUBLICATIONS

Vivitar Twist-N-Hold-Phone https://www.sears.com/vivitar-th600-trg-vivitar-twist-n-hold-phone/p-SPM12692227738# (Sep. 6, 2019).

*Primary Examiner* — Adam J Waggenspack
(74) *Attorney, Agent, or Firm* — Loza & Loza LLP; Kevin L. Soules

(57) ABSTRACT

A system, method, and apparatus for securely gripping a mobile device can comprise a device connecting assembly comprising an upper base with an orifice formed therein, a bottom base, and a peg formed on the bottom base, a finger gripping assembly, and at least one jointed connection assembly connecting the device connecting assembly and the finger gripping assembly. A connective material can be formed on a bottom base. The finger side strut is configured to fold between two legs of the device side strut.

16 Claims, 13 Drawing Sheets

(56) References Cited

U.S. PATENT DOCUMENTS

| | | | |
|---|---|---|---|
| 3,447,195 A * | 6/1969 | Bush | A45C 13/22 |
| | | | 16/405 |
| 5,361,456 A * | 11/1994 | Newby, Sr. | E05D 7/10 |
| | | | 16/257 |
| 5,557,587 A * | 9/1996 | Tosaka | A44C 5/145 |
| | | | 224/164 |
| 5,568,549 A | 10/1996 | Wang | |
| D471,547 S | 3/2003 | Ruohonen | |
| 7,422,486 B2 | 9/2008 | Hoff et al. | |
| 7,540,788 B2 | 6/2009 | Murphy et al. | |
| 7,644,895 B2 | 1/2010 | Tseng | |
| 8,560,031 B2 | 10/2013 | Barnett et al. | |
| D777,022 S | 1/2017 | Barnett | |
| D794,607 S | 8/2017 | Srour | |
| 9,787,348 B2 | 10/2017 | Srour | |
| 9,800,703 B2 | 10/2017 | Roux | |
| D818,808 S | 5/2018 | Barnett | |
| 10,019,034 B2 | 7/2018 | Barnett et al. | |
| 10,149,520 B2 * | 12/2018 | Mace | A44C 5/145 |
| D839,257 S | 1/2019 | Polseno, Sr. | |
| 10,244,854 B1 * | 4/2019 | Haber | A45F 5/10 |
| D847,805 S | 5/2019 | Lederer | |
| D863,287 S | 10/2019 | Srour | |
| 2005/0243522 A1 | 11/2005 | Nilsen et al. | |
| 2008/0090443 A1 | 4/2008 | Ackloo | |
| 2011/0084081 A1 | 4/2011 | Chung et al. | |
| 2011/0240493 A1 * | 10/2011 | Adams | A45C 13/1069 |
| | | | 206/216 |
| 2014/0317329 A1 | 10/2014 | Barnett et al. | |
| 2016/0069512 A1 * | 3/2016 | Grieve | A45F 5/00 |
| | | | 294/142 |
| 2016/0088924 A1 * | 3/2016 | Haymond | A45F 5/00 |
| | | | 224/218 |
| 2016/0143403 A1 * | 5/2016 | Pluemer | A44C 5/00 |
| | | | 224/267 |
| 2016/0220000 A1 | 8/2016 | McGuckin | |
| 2018/0184773 A1 * | 7/2018 | Whitten | B60R 11/0241 |
| 2018/0245734 A1 * | 8/2018 | Kim | F16M 13/022 |
| 2019/0141174 A1 * | 5/2019 | Britt | H04B 1/385 |

\* cited by examiner

SECURE DEVICE GRIP

CROSS-REFERENCE TO RELATED PATENT APPLICATIONS

This patent application claims the priority and benefit under 35 U.S.C. § 119(e) of U.S. Provisional Patent Application Ser. No. 62/831,082, filed Apr. 8, 2019, entitled "SECURE MEDIA DEVICE GRIP." U.S. Provisional Patent Application Ser. No. 62/831,082 is herein incorporated by reference in its entirety.

TECHNICAL FIELD

Embodiments are generally related to the field of grip improvement devices for mobile electronics. Embodiments are also related to systems, apparatuses, and methods for extendable and retractable devices that can be connected to mobile devices and can serve as stands, handholds, finger holds, car mounts or for other such purposes.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for gripping a device.

It is another aspect of the disclosed embodiments to provide a method and system/apparatus for an extendable and retractable apparatus for grasping a device.

It is another aspect of the disclosed embodiments to provide a method and system/apparatus for extending and retracting a grasping or gripping device associated with a mobile device.

It is another aspect of the disclosed embodiments to provide methods, systems, and apparatuses for improved mobile device stands.

It is another aspect of the disclosed embodiments to provide methods, systems, and apparatuses for improved mobile device grips.

It is another aspect of the disclosed embodiments to provide methods, systems, devices and apparatuses for providing an extendable device grip, with a low profile in a stowed position.

The aforementioned aspects and other objectives and advantages can now be achieved as described herein. In an exemplary embodiment, an apparatus comprises a device connecting assembly, a finger gripping assembly; and at least one jointed connection assembly connecting the device connecting assembly and the finger gripping assembly.

In an embodiment, the device connecting assembly comprises: an upper base with an orifice formed therein, a bottom base, and a peg formed on the bottom base. In an embodiment, the device connecting assembly comprises: a rigid base, a grip layer, and a snap swivel connection between said rigid base and said grip layer. In an embodiment, the device connecting assembly comprises a connective material formed on a bottom base. In an embodiment, the device connecting assembly comprises at least one channel joint.

In an embodiment the finger gripping assembly further comprises at least one top channel joint.

In an embodiment, the at least one jointed connection assembly comprises a device side strut, a finger side strut, and a leg joint connecting the device side strut to the finger side strut. In an embodiment, the device side strut further comprises two legs connected by an axel and a c-clamp connected to each of the two legs. In an embodiment, the finger side strut further comprises a leg, a first c-clasp connected to one end of the leg, and a second c-clasp connected to another end of the leg.

In an embodiment, the finger side strut is configured to fold between two legs of the device side strut.

In another embodiment, an apparatus comprises a device connecting assembly comprising a rigid base connected to a grip layer, and at least one channel joint, a finger gripping assembly comprising at least one top channel joint, and at least one jointed connection assembly comprising at least one device side strut connected to at least one finger side strut with a leg joint, wherein the jointed connection assembly connects to the at least on channel joint and the at least one top channel joint.

In an embodiment, the rigid base comprises a device case. In an embodiment the case includes a peg formed on the device case wherein the peg connects to an orifice in the grip layer. In an embodiment the case includes a snap swivel connection between the rigid base and grip layer. In an embodiment the case includes a rivet swivel connection between the rigid base and grip layer.

In an embodiment a system comprises a device connecting assembly comprising a rigid base and at least one channel joint, a finger gripping assembly comprising at least one top channel joint, and at least one jointed connection assembly wherein the jointed connection assembly connects to the at least on channel joint and the at least one top channel joint.

In an embodiment the system further comprises one of a snap swivel connection between the rigid base and a grip layer, and a rivet swivel connection between the rigid base and the grip layer.

In an embodiment, the system further comprises a magnet formed in the finger gripping assembly that facilitates connection to a mounting assembly such as a car mounting assembly.

BRIEF DESCRIPTION OF THE FIGURES

The accompanying figures, in which like reference numerals refer to identical or functionally-similar elements throughout the separate views and which are incorporated in, and form a part of the specification, further illustrate the embodiments and, together with the detailed description, serve to explain the embodiments disclosed herein.

DETAILED DESCRIPTION

Figure 1:
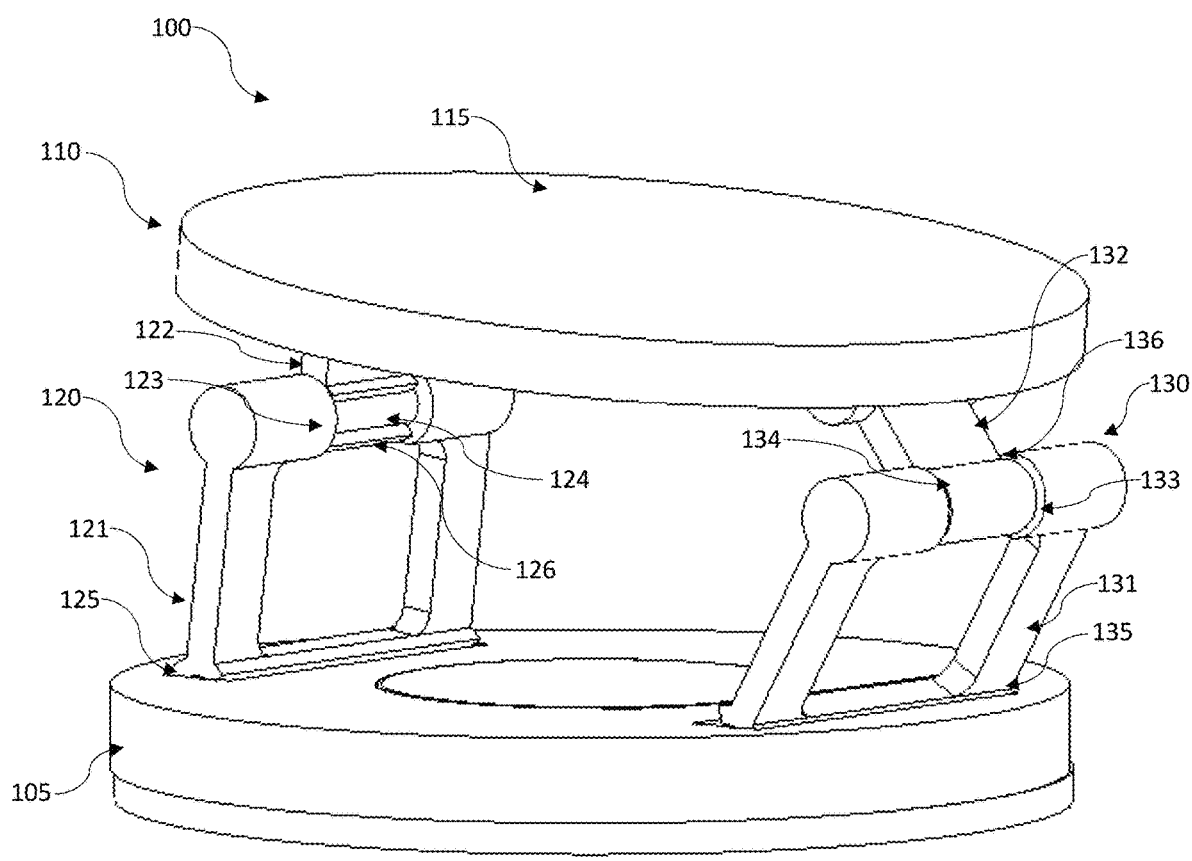
FIG. 1 depicts secure gripping system/apparatus in accordance with the disclosed embodiments.

The particular values and configurations discussed in the following non-limiting examples can be varied, and are cited merely to illustrate one or more embodiments and are not intended to limit the scope thereof.

Example embodiments will now be described more fully hereinafter with reference to the accompanying drawings, in which illustrative embodiments are shown. The embodiments disclosed herein can be embodied in many different forms and should not be construed as limited to the embodiments set forth herein; rather, these embodiments are provided so that this disclosure will be thorough and complete, and will fully convey the scope of the embodiments to those skilled in the art. Like numbers refer to like elements throughout.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context. All aspects of the various embodiments, can be interchangeable with aspects disclosed in other embodiments, and/or can be incorporated in other embodiments.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

In certain embodiments, a secure device grip 100 is disclosed. The device grip 100 is illustrated in FIG. 1. The device grip 100 generally includes a device connecting assembly 105 configured for attaching to an external device such as a smartphone, mobile phone, tablet device, mobile device case, or other such device. The device connecting assembly 105 is connected to a finger gripping assembly 110 via one or more jointed connection assemblies, illustrated as jointed connection assembly 120 and jointed connection assembly 130 in FIG. 1. The finger gripping assembly 110 generally includes a rigid or semi-rigid platform 115 that can be easily engaged in, between, and/or over, a user's hands or fingers. In certain embodiments, at least one of jointed connection assembly 120 and jointed connection assembly 130 can connect the device connecting assembly 105 and the finger gripping assembly 110.

Each of jointed connection assembly 120 and jointed connection assembly 130 can be mounted to the device connecting assembly 105 with joint 125 and joint 135 respectively. Joint 125 and joint 135 can comprise channel joints, as illustrated in FIG. 1.

The jointed connection assembly 120 can include a device-side strut 121 connected to finger-side strut 122 with a leg joint 123. The leg joint 123 can comprise a cylindrical axel 124 associated with the device-side strut 121, engaged by a c-clamp 126 extending from the finger-side strut 122. The top of the finger-side strut 122 can connect to the finger gripping assembly 115 with a channel joint formed on the bottom surface of the finger gripping assembly.

The jointed connection assembly 130 can include a device-side strut 131 connected to finger-side strut 132 with a leg joint 133. The leg joint 133 can comprise a cylindrical axel 134 associated with the device-side strut 131, engaged by a c-clamp 136 extending from the finger-side strut 132. The top of the finger-side strut 132 can connect to the finger gripping assembly 115 with a channel joint formed on the bottom surface of the finger gripping assembly 110.

In the embodiment illustrated in FIG. 1 the device grip 100 includes 2 jointed connection assemblies. However, in other embodiments, more or fewer jointed connection assemblies can be included according to design considerations.

The jointed connection assemblies, illustrated in FIG. 1 are configured to move independently from one another, in order to facilitate adjustment of the orientation of the finger gripping assembly 110 with respect to the device connecting assembly 105. The orientation of the finger gripping assembly 110 allows the viewing angle of the device connected to the device connecting assembly 105 to be adjusted.

For example, in certain embodiments, the leg joint 123 and leg joint 133 can fold inwardly and/or outwardly. The arm joints allow the finger gripping assembly 110 to be retracted toward the device connecting assembly 105 and/or to reduce the total depth of the device grip 100 so that it better fits, for example, in a user's pocket, purse, or for other storage.

Figure 2A:
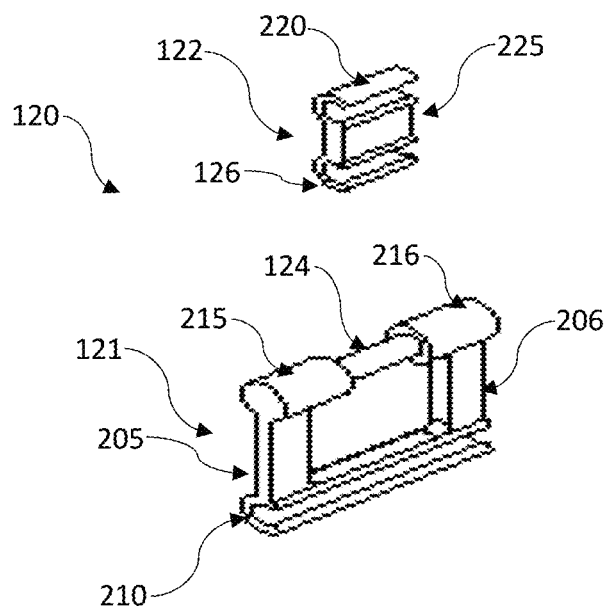
FIG. 2A depicts a jointed connection assembly, in accordance with the disclosed embodiments.
Figure 2B:
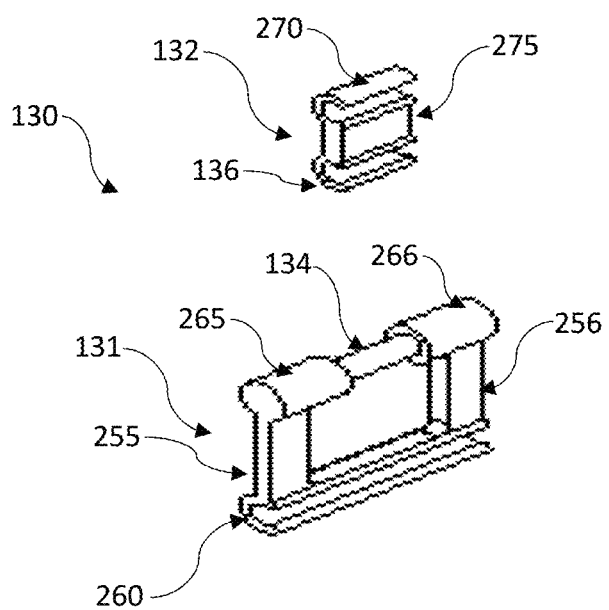
FIG. 2B depicts a jointed connection assembly, in accordance with the disclosed embodiments.

FIGS. 2A and 2B illustrate an exemplary embodiment the jointed connection assembly 120 and jointed connection assembly 130 respectively. In FIG. 2A the jointed connection assembly 120 is illustrated. The device-side strut 121 can comprise two legs, leg 205 and leg 206. The top of leg 205 comprises a barreled port 215 which houses one end of axel 124. Similarly, the top of leg 206 comprises a barreled port 216 that houses the other end of axel 124. The bottom of each of legs 205 and 206 is connected to c-clamp 210, that is used to rotatably engage the jointed connection assembly 120 to the device connecting assembly 105.

The finger-side strut 122 can comprise a single leg 225 with c-clamp 126 formed on one end, and c-clamp 220 formed on the other end. The c-clamp 126 engages with axel 124. The c-clamp 220 is configured to rotatably engage the jointed connection assembly 120 to the finger gripping assembly 110.

The jointed connection assembly 120 is configured so that the single leg 225 can rotate into a position between leg 205 and leg 206 when the c-clamp 126 rotates around axel 124. This configuration allows the jointed connection assembly to have a very low profile when it is in a fully flexed position.

In FIG. 2B the jointed connection assembly 130 is illustrated. The device-side strut 131 can comprise two legs, leg 255 and leg 256. The top of leg 255 comprises a barreled port 265 which houses one end of axel 134. Similarly, the top of leg 256 comprises a barreled port 266 that houses the other end of axel 134. The bottom of each of legs 255 and 256 is connected to c-clamp 260, that is used to rotatably engage the jointed connection assembly 130 to the device connecting assembly 105.

The finger-side strut 132 can comprise a single leg 275 with c-clamp 136 formed on one end and c-clamp 270 formed on the other end. The c-clamp 136 engages with axel 134. The c-clamp 270 is configured to rotatably engage the jointed connection assembly 130 to the finger gripping assembly 110.

The jointed connection assembly 130 is configured so that the single leg 275 can rotate into a position between leg 255 and leg 256 when the c-clamp 136 rotates around axel 134. This configuration allows the jointed connection assembly 130 to have a very low profile when it is in a fully flexed position.

The finger gripping assembly 110 can be retracted toward the device connecting assembly 105 using the jointed connection assembly 120 and jointed connection assembly 130. The device side struts, which each include two legs, are oriented such that the single leg of the finger-side struts fold between the device side struts, facilitating a slim folded profile. It should be understood that each of the jointed connection assemblies can be folded inwardly or outwardly, independently to provide unlimited adjustments to the orientation of the finger gripping assembly 110 with respect to the device connecting assembly 105, as required for various applications.

Figure 3A:
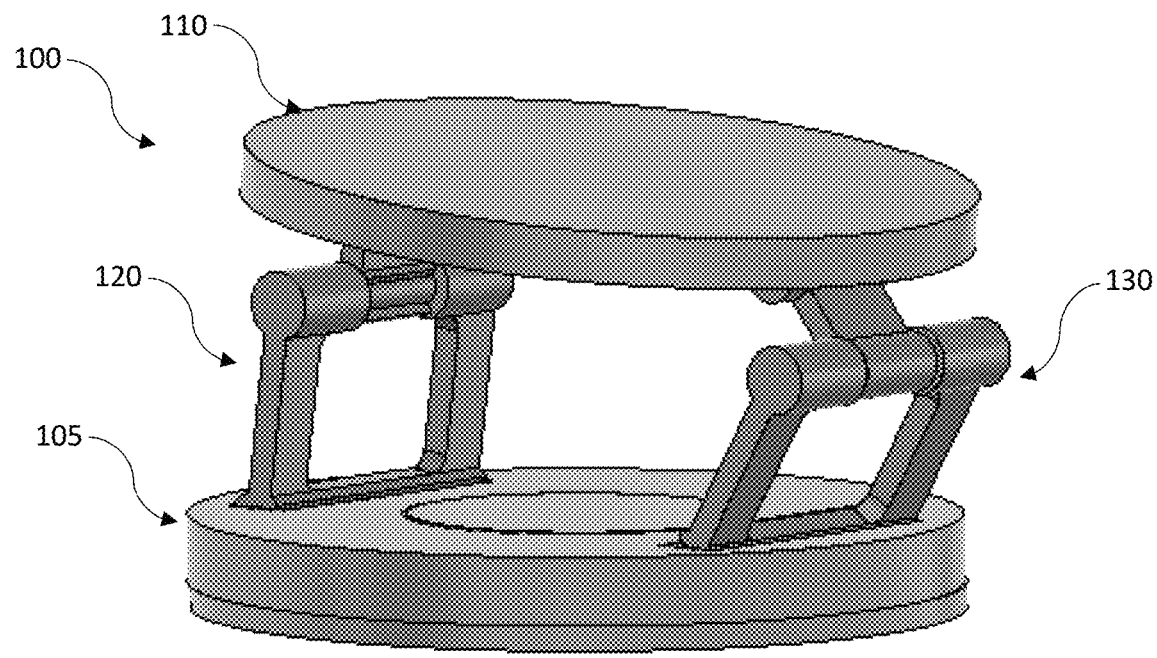
FIG. 3A depicts a secure gripping system/apparatus in a partially retracted configuration, in accordance with the disclosed embodiments.

One such orientation is illustrated in FIG. 3A. In FIG. 3A, the orientation of the finger gripping assembly 110 is illustrated with jointed connection assembly 120 at full extension and jointed connection assembly 130 partially bent to provide a tilted surface orientation of the device connecting assembly 105 with respect to the finger gripping assembly 110.

Figure 3B:
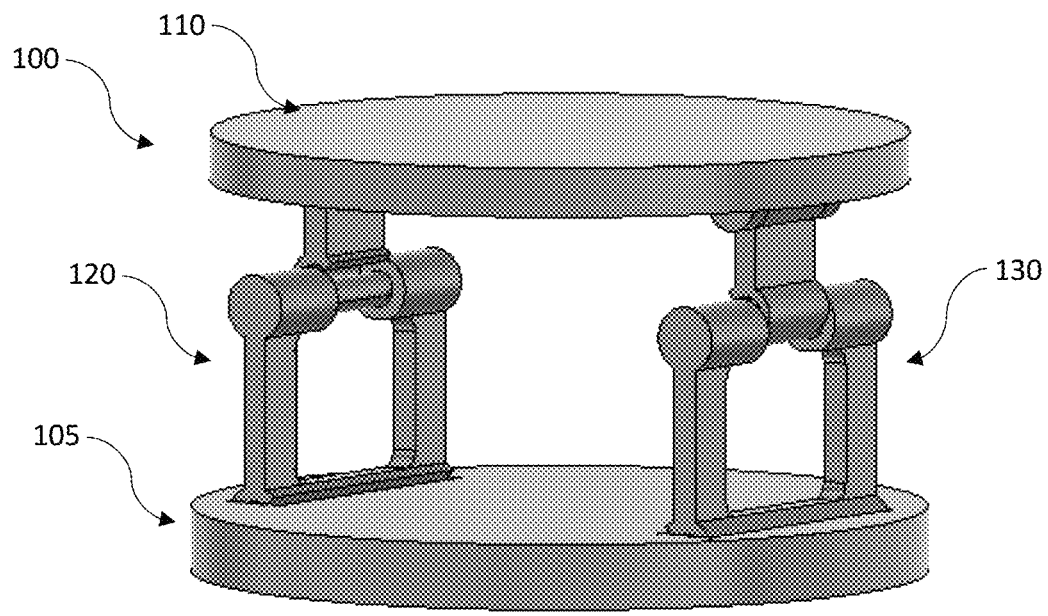
FIG. 3B depicts a secure gripping system/apparatus in a fully extended configuration, in accordance with the disclosed embodiments.

Likewise, as illustrated in FIG. 3B, both jointed connection assembly 120 and jointed connection assembly 130 are shown at full extension. At full extension the jointed connection assemblies 120 and 130 allow the finger gripping assembly 110 to be extended away from the device connecting assembly 105 so that a user can grasp the finger gripping assembly and/or insert one or more fingers between the device connecting assembly 105 and finger gripping assembly 110.

The device grip 100 is configured to improve single-handed manipulation of a mobile device. The jointed connection assemblies can be adjusted to allow the finger gripping assembly 110 to be comfortably controlled by the user, and to provide a proper view angle of a mobile device connected to the device connecting assembly 105. In other embodiments, the finger gripping device can be adjusted with the jointed connection assemblies such that it can serve as a stand to hold the mobile device in an upright, or other desired orientation.

Figure 4A:
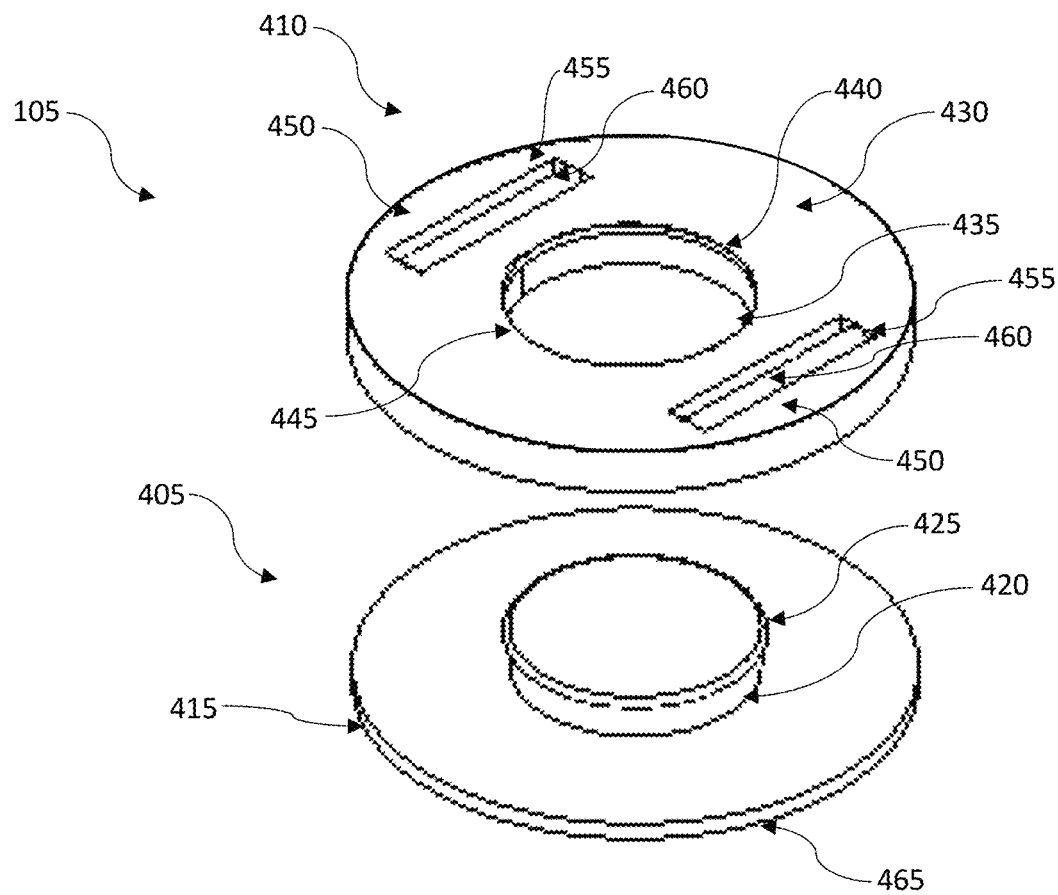
FIG. 4A depicts a device connecting assembly, in accordance with the disclosed embodiments.

FIG. 4A illustrates a detailed view of the device connecting assembly 105. The device connecting assembly 105 can comprise a bottom base 405 and an upper base 410. The bottom base 405 can be engaged to the upper base 410 to form the completed device connecting assembly 105.

The bottom base 405 comprises a base structure 415 with a peg 420 formed thereon. The peg 420 includes a lip 425 on its upper rim. In certain embodiments, the base structure 415 can be circular or disc shaped, but other shapes can also be used. The peg 420 can similarly comprise a tubular structure, but other peg shapes such as a square, triangle, or star pattern, etc., can be used, as required by design considerations.

The bottom base 405 can be connected to the orifice 435 of the annular structure 430 of the upper base 410. Specifically, the peg 420 is configured to fit in the orifice 435 of the annular structure 430. The peg 420 engages with the annular structure 430 to form the device connecting assembly 105. The lip 425 on the peg 420 can fit with a similarly configured extrusion 440 in the rim 445 of the orifice 435 of the annular structure 430. When the lip 425 of the peg 420 is engaged (i.e. "snapped") in the extrusion 440 of the rim 445, the connection is less likely to be accidentally jostled apart.

The upper base 410 further comprises at least one channel joint 450. The channel joint 450 can include a channel 455 with an axel 460 formed therein. In FIG. 4, two such channel joints 450 are illustrated, but in other embodiments, more or fewer channel joints 450 can be used. The axel 460 is configured to interface with c-clamp 210 or c-clamp 260. The channel joints 450 facilitate a rotational connection. The jointed connection assemblies 120 and 130, can be rotated via rotation of c-clamp 210 or c-clamp 260 around axel 460.

Figure 4B:
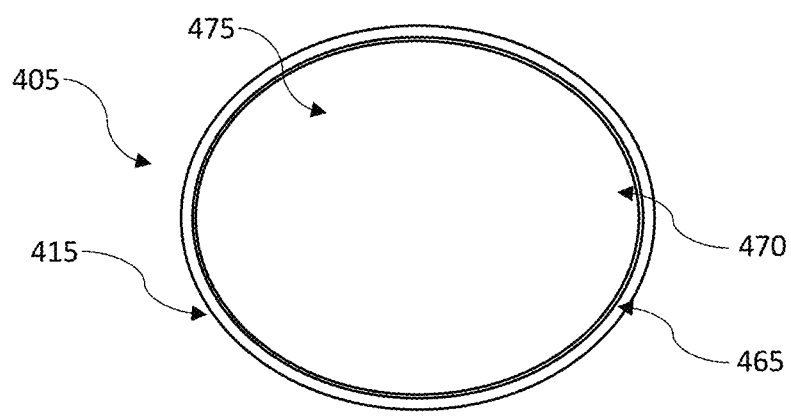
FIG. 4B depicts a bottom base of a device connecting assembly, in accordance with the disclosed embodiments.

FIG. 4B illustrates the exterior facing side 465 of the base structure 415. The exterior facing side 465 can be coated with an outward facing connective material 470 that can comprise connective glue, stick'em, double sided tape, or other such connecting material. A removable cover 475 can be provided over the connective material 470 to protect the connective material 470 until it is ready for use (i.e. engagement to a mobile device). The exterior facing side 465 is configured to connect to a mobile device, such as a mobile telephone, cell phone, tablet device, device cover, or the like.

In other embodiments, the exterior facing side 465 can be configured with a suction type connection, such as a suction cup, or other such configuration, to facilitate a semi-permanent connection to a mobile device, mobile device cover, or for mounting to an external surface, such as in a vehicle. In other embodiments, other configurations of the surface can be employed to achieve a permanent or semi-permanent connection between the secure device grip 100 and the mobile device.

Figure 5A:
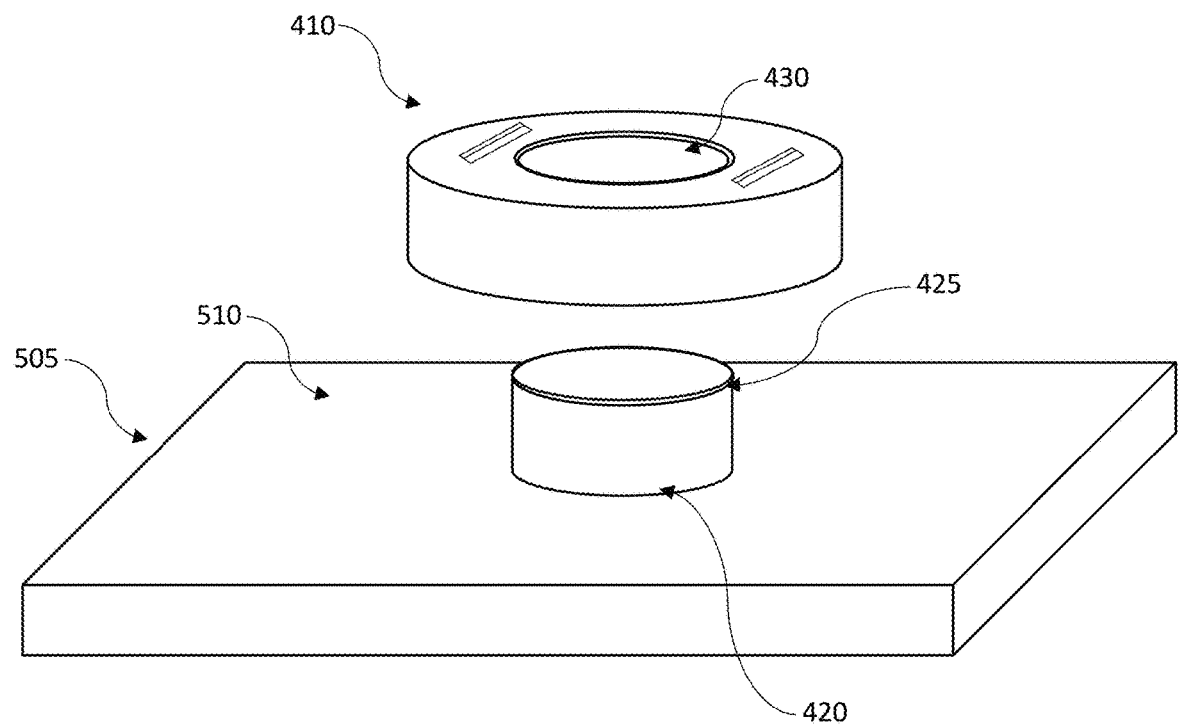
FIG. 5A depicts a case mounted gripping system/apparatus in accordance with the disclosed embodiments.
Figure 5B:
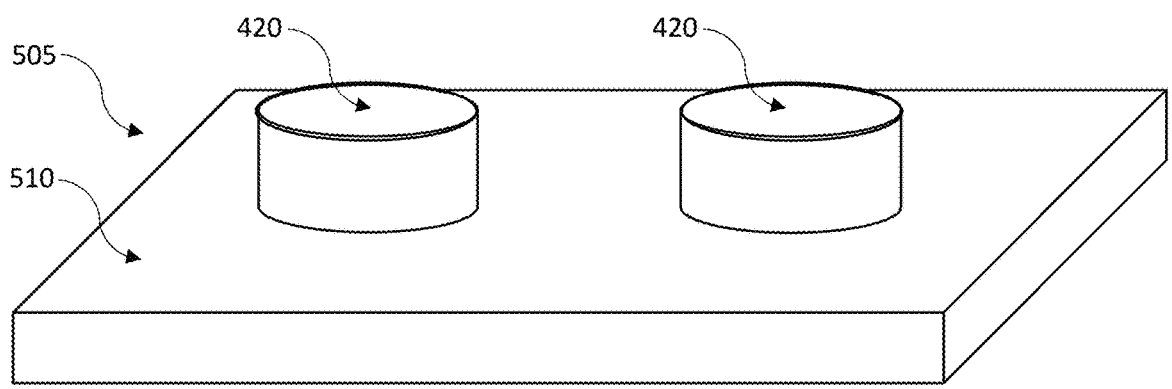
FIG. 5B depicts an additional case mounted gripping system/apparatus in accordance with the disclosed embodiments.

In other embodiments, the device connecting assembly 105 can be integrated into a case 505 for a mobile device, as illustrated in FIG. 5A. In such embodiments, the peg 420 can extend from the rear surface 510 of the case 505 for engagement with the annular structure 430. In certain embodiments, the carrying case 505 can include multiple pegs 420 provided at various locations on the rear surface 510 of the case 505 so that the assembly can be connected to the case 505 at various locations, as illustrated in FIG. 5B, according to the desired application (e.g. as a stand, as a grip, as a car mount, etc.).

Figure 6:
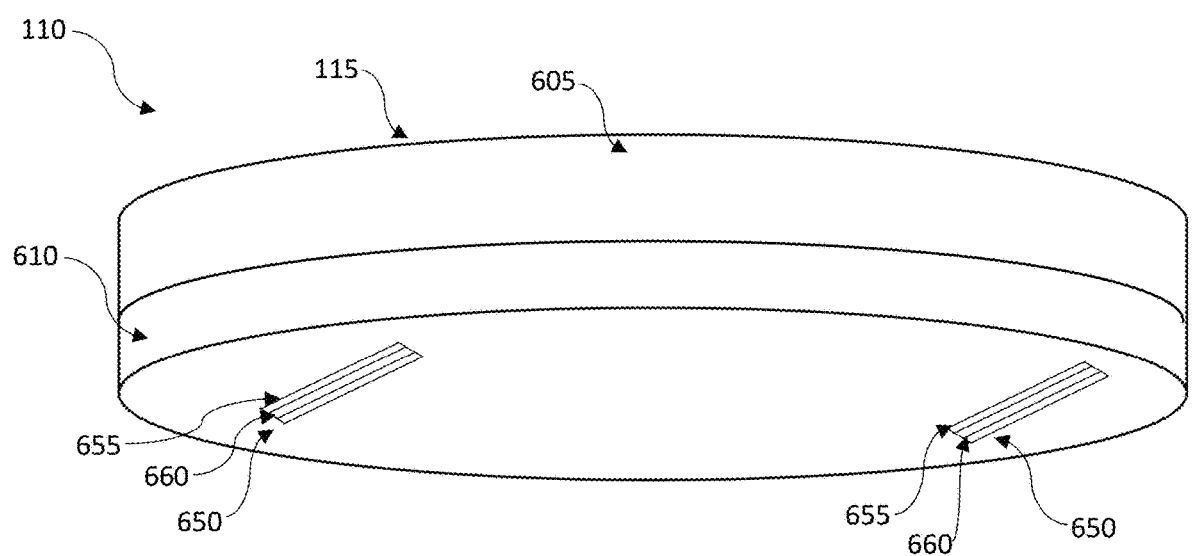
FIG. 6 depicts a perspective view of a finger gripping assembly in accordance with the disclosed embodiments.

FIG. 6 illustrates a detailed view of the finger gripping assembly 110. The rigid or semi-rigid platform 115 can comprise a structural base 605 and a finger interface layer 610. The finger interface layer 610 can be formed of a semi rigid material such as rubber or plastic, that is comfortable against a user's finger. The finger interface layer 610 can also include specialized shapes, as further detailed herein to enhance the ergonomics of the device grip 100.

The finger gripping assembly 110 can further comprise at least one top channel joint 650. The top channel joint 650 can include a channel 655 with an axel 660 formed therein. In FIG. 6, two such top channel joints 650 are illustrated, but in other embodiments, more or fewer top channel joints 650 can be used. The axel 660 is configured to interface with c-clamp 220 or c-clamp 270. The top channel joints 650 facilitate the rotational adjustment of the jointed connection assemblies 120 and 130 via rotation of c-clamp 220 or c-clamp 270 around axel 660.

Figure 7:
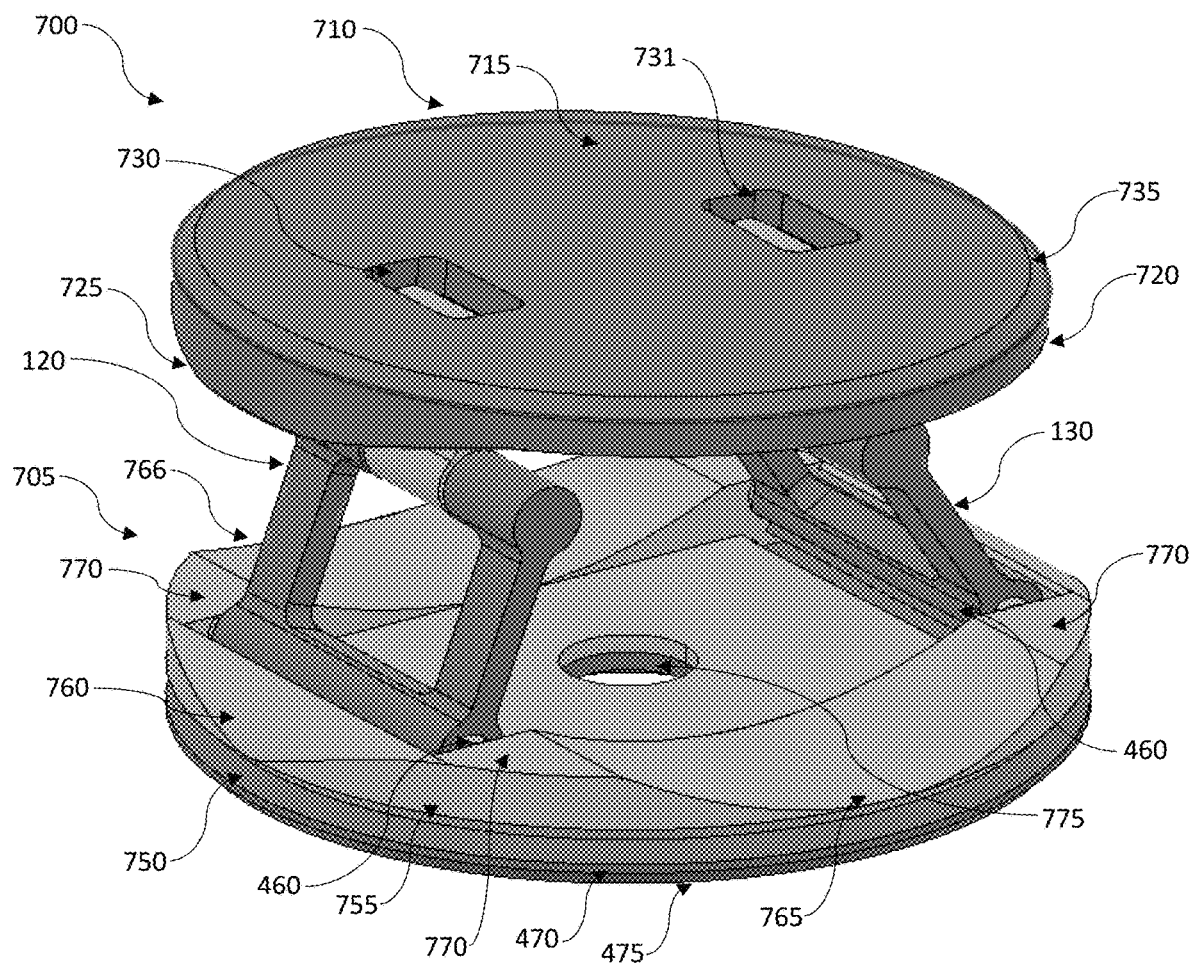
FIG. 7 depicts another embodiment of a secure gripping system/apparatus, in accordance with the disclosed embodiments.

FIG. 7 illustrates an alternative embodiment of a device grip 700 in accordance with another embodiment. It should be understood that one or more of the features of device grip 700 and device grip 100 are interchangeable, and can be used in combination with each of the respective embodiments. Like elements are referenced with like reference numerals in the figures.

In the embodiment illustrated in FIG. 7, the device grip 700 includes a device connecting assembly 705. The device connecting assembly 705 is connected to a finger gripping assembly 710 via one or more jointed connection assemblies, illustrated as jointed connection assembly 120 and jointed connection assembly 130.

The finger gripping assembly 710 can comprise a rigid or semi-rigid platform 715 and an inner layer 720, that can be easily engaged in, between, and/or over, a user's hands or fingers. The semi-rigid platform 715 can have a beveled rim 735. The inner layer 720 can have thicker lipped sections 725, formed radially outward from the jointed connection assembly 120 and jointed connection assembly 130. The inner layer 720 can be formed of a material such as rubber, plastic, closed cell foam, fabric, etc., that provides a comfortable grip for a user.

Channel 730 and channel 731 can be formed through the finger gripping assembly 710, and house axels for connection to the jointed connection assembly 120 and jointed connection assembly 130.

The device connecting assembly 705, can comprise a rigid base 750 and a waved layer 755. The waved layer 755 comprises thinner lipped sections 760 that can be aligned with, and configured to accept, the thicker lipped sections 725 of the inner layer 720. The waved layer 755 can be formed of a material such as rubber, plastic, closed cell foam, fabric, etc., that provides a comfortable grip for a user.

Likewise, the device connecting assembly 705 can further comprise finger cutout 765 and finger cutout 766 of the waved layer 755. The finger cutout 765 and finger cutout 766 are designed to facilitate ergonomic engagement with a user's finger or fingers.

The waved layer 755 includes corner ports 770 that house axels, such as axels 460. As illustrated, the axels 460 provide the connection between the device connecting assembly 705 and jointed connection assemblies 120 and 130.

The exterior facing side of the rigid base 750 can be coated with an outward facing connective material 470 that can comprise connective glue, stick'em, double sided tape, or other such connecting material. A removable cover 475 can be provided over the connective material 470 to protect the connective material 470 until it is ready for use. The device connecting assembly can further include an annular orifice 775 that can connect with a peg formed in a mobile device case as illustrated in FIGS. 5A and 5B.

The jointed connection assemblies, illustrated in FIG. 7 are configured to move independently from one another, in order to facilitate adjustment of the orientation of the finger gripping assembly 710 with respect to the device connecting assembly 705. The orientation of the finger gripping assembly 710 allows the viewing angle of the device connected to the device connecting assembly to be adjusted.

The integrated "wave" profile of the waved layer 755 facilitates improved manipulation of the system. The peaks and valleys along the rims of the finger gripping assembly 710 and device connecting assembly 705, along with contours formed along the internal facing surfaces are ergonomically advantageous. The shape of the waved layer 755 and inner layer 720 can be selected to improve the user's grip on the system/apparatus and, by extension, the associated mobile device. The shapes can also be selected so that the finger gripping assembly 710 and device connecting assembly 705 create a flush interface when the finger gripping assembly 710 is retracted toward the device connecting assembly 705.

Figure 8A:
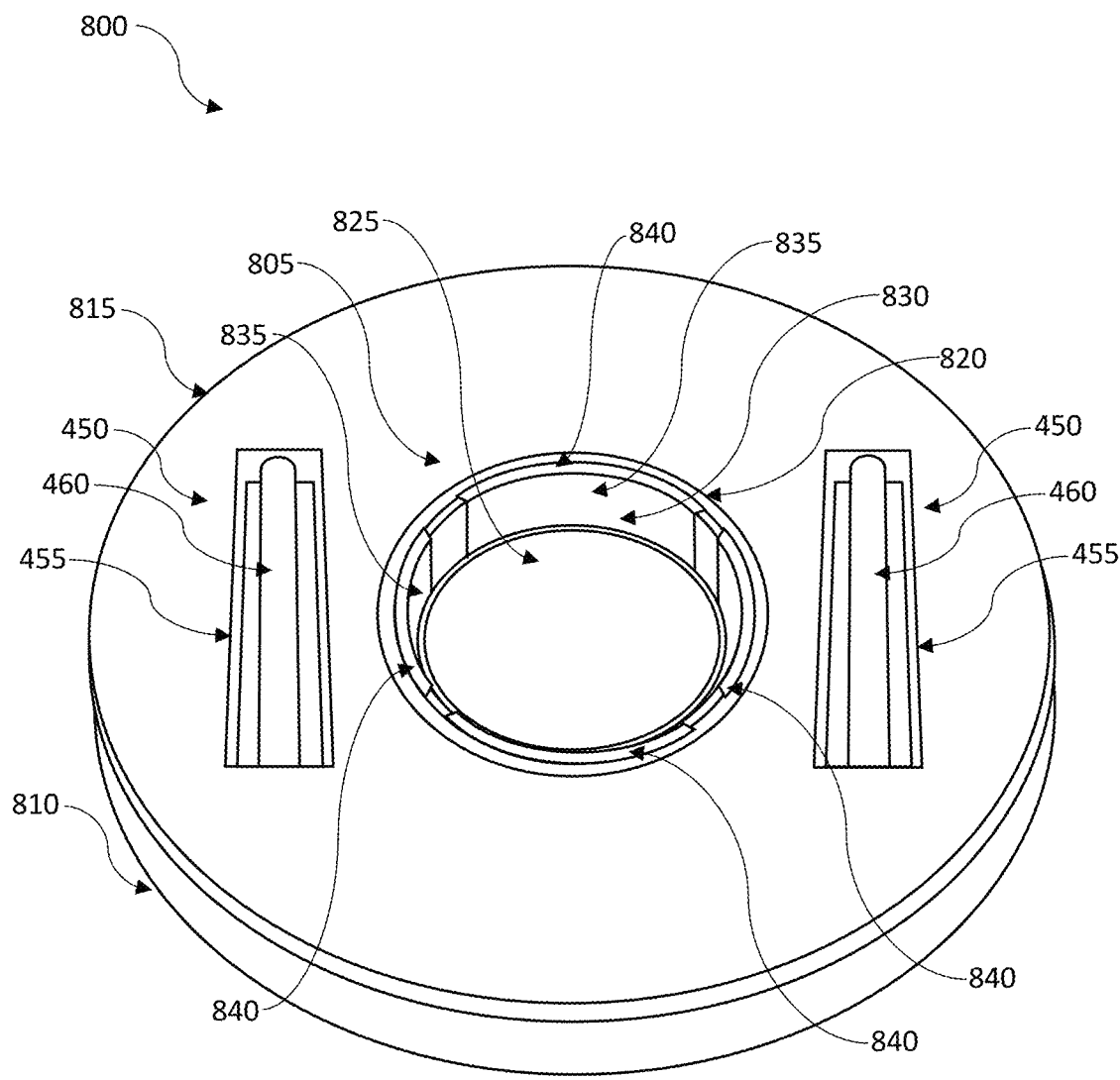
FIG. 8A depicts an alternative embodiment of a rotating device connecting assembly, in accordance with the disclosed embodiments.
Figure 8B:
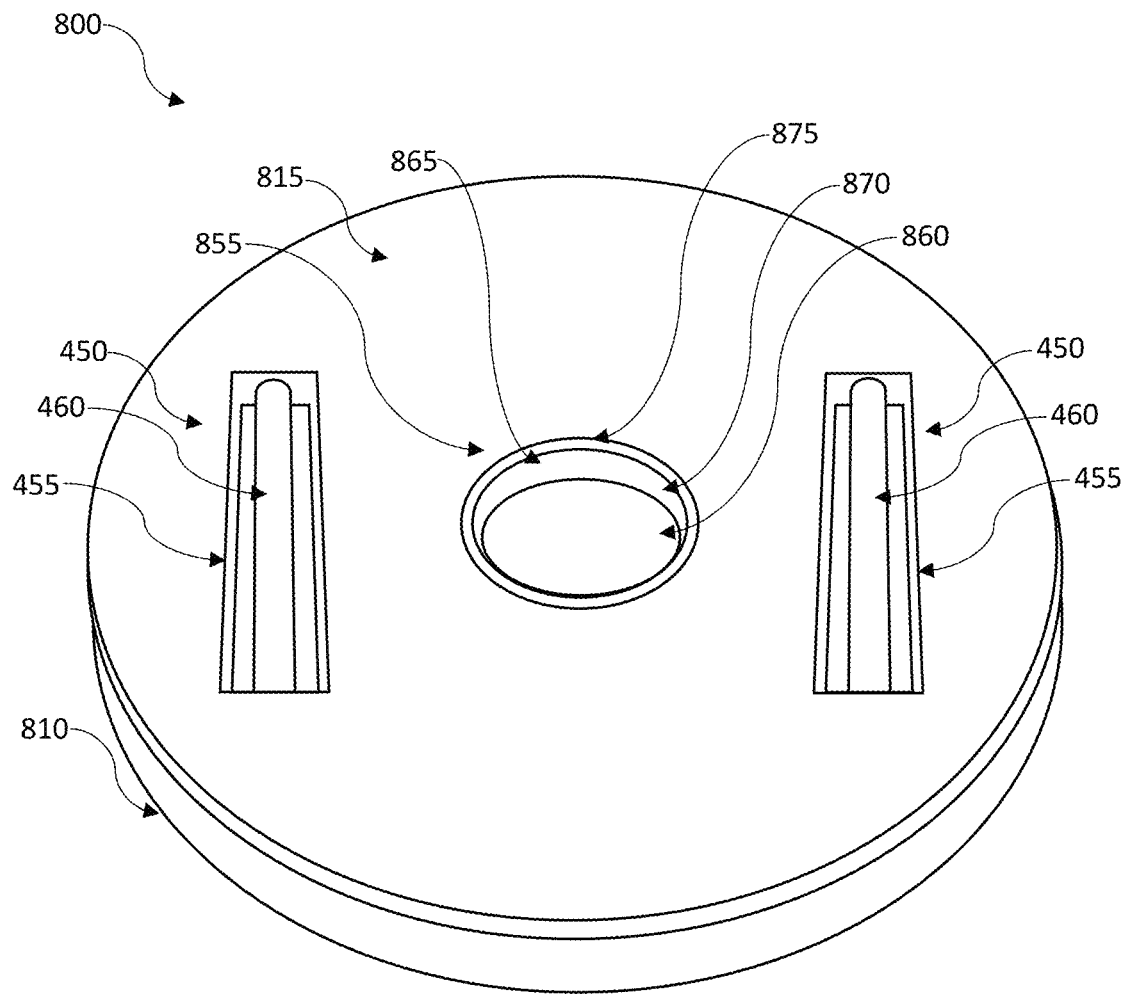
FIG. 8B depicts an alternative embodiment of a rotating device connecting assembly, in accordance with the disclosed embodiments.

FIGS. 8A and 8B illustrate embodiments of a device connecting assembly 800 that can be used in combination with any of the embodiments disclosed herein, including device gripping assembly 105 or device connecting assembly 705, and can incorporate any of the features associated with other embodiments disclosed herein.

The device connecting assembly 800 incorporates a snap swivel connection 805 between a rigid base 810 and a grip layer 815. The snap swivel connection 805 includes an orifice 825 in the grip layer 815. A channel 820 is formed in the grip layer 815. The rigid base 810 includes a snap fitting 830 comprising a series of connected fins 835. The fins 835 have a lip 840. The snap fitting 830 can be inserted through the orifice 825 and the lip 840 snaps into the channel 820.

The grip layer 815 further includes at least one channel joint 450 (two channel joints are illustrated in FIG. 8A). The channel joints 450 can include a channel 455 with an axel 460 formed therein. The axel 460 is configured to interface with c-clamp 210 or c-clamp 260.

The snap swivel connection 805 allows the grip layer 815 to rotate independently from the rigid base 810. During use, the rigid base 810 can be connected to a mobile device or mobile device case. Once the rigid base 810 is connected to the device. The snap swivel connection allows the rigid base, and device connected thereto, to rotate independently of the grip layer 815. Thus, the user can change the orientation of the device without rotating the hand they are using to hold the device with the device gripping system.

The device connecting assembly 800 can alternatively incorporate a rivet swivel connection 855 between a rigid base 810 and a grip layer 815, as illustrated in FIG. 8B. The rivet swivel connection 855 includes an orifice 860 in the grip layer 815. The rigid base 810 includes a rivet fitting 865 comprising a rivet 870 with a lip 875. In certain embodiments, the rivet 870 can be hollow. The rivet fitting 865 can be inserted through the orifice 825 and the lip 875 can engage the rigid base 810 and grip layer 815. The grip layer 815 further includes at least one channel joint 450 (two channel joints are illustrated in FIG. 8A). The channel joints 450 can include a channel 455 with an axel 460 formed therein. The axel 460 is configured to interface with c-clamp 210 or c-clamp 260.

The rivet swivel connection 855 allows the grip layer 815 to rotate independently from the rigid base 810. During use, the rigid base 810 can be connected to a mobile device or mobile device case. Once the rigid base 810 is connected to the device, the rivet swivel connection 855 allows the rigid base 810, and device connected thereto, to rotate independently of the grip layer 815. Thus, the user can change the orientation of the device without rotating the hand they are using to hold the device with the device gripping system.

Figure 9:
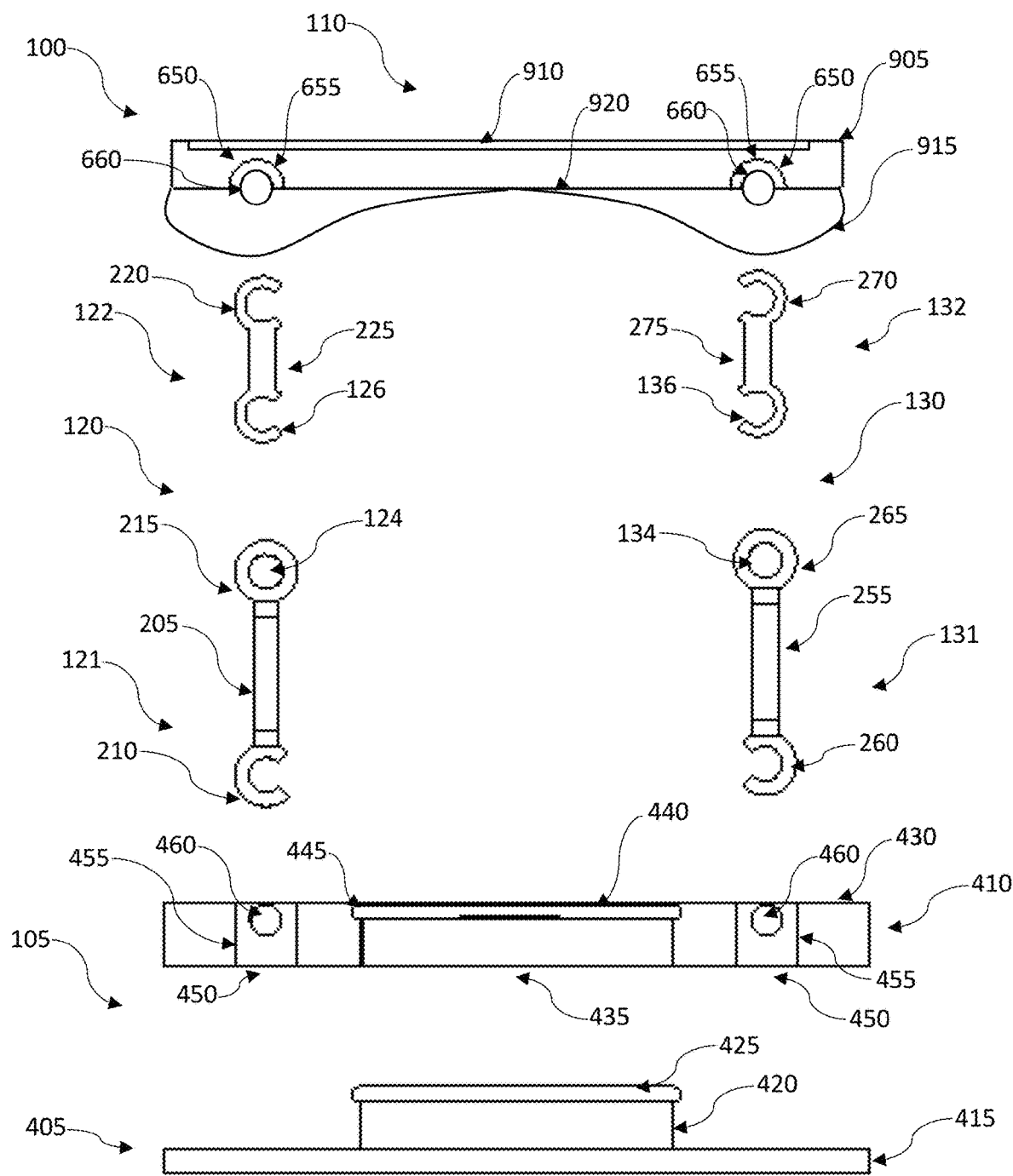
FIG. 9 depicts an elevation view of a secure gripping device, in accordance with the disclosed embodiments.

FIG. 9 illustrates a separated view of the various components of device grip 100 in accordance with the disclosed embodiments. As illustrated, the device grip 100 includes the finger grip assembly 110. The finger grip assembly 110 can be a circular disc formed of rubber, plastic, or other such materials. The outside surface of the finger grip assembly 110 can be textured to improve grip. The exterior surface can also include ridges, waves, dimples, or other such structural formations to improve grip.

The finger grip assembly 110 can be formed of a material that is comfortable to grip. In some embodiments this can be at least one solid piece of rubber and/or plastic. In other embodiments, it can comprise an internal ridged structure surrounded by a cover that can be ridged, semi-rigid, or soft. The cover can be malleable rubber, cloth, or other such material.

In additional embodiments, the exterior surface 905 of the finger hold can comprise a magnetic material such as a magnetic plate. In certain embodiments, a magnet and/or magnetic plate 910 can be incorporated in, or surrounded by, the exterior surface 905, that can be engaged to other metal objects via magnetic forces. In certain embodiments, this allows the finger grip assembly 110 to engage with, for example, a magnetized mount, such as a magnetized car mounted assembly, as illustrated in FIGS. 11A-11D, such that the mobile device can be magnetically connected to the car mounted assembly with the secure device grip 100.

The reverse side, or finger side, of the finger grip assembly 110 can similarly be configured to facilitate a solid comfortable grip. The finger side can include an outer layer 915 that is contoured to provide finger channels 920, to match the natural contour of a user's fingers. The finger side can further provide finger stays that provide structural knobs, bumps, and/or textures, where a user's finger tips can hold.

The finger grip assembly 110 can include one or more top channel joints 650 where the jointed connection assembly 120 and jointed connection assembly 130 can connect to the finger grip assembly 110. The top channel joints 650 include a channel 655 or other indentation formed in the finger grip assembly 110, with an axel 660 extending through channel 655. In certain embodiments, the ends of the axel 660 can be molded in the finger grip assembly 110. In other embodiments, the axel 660 can be held in place via joint glue, bonding, or other such means. In still other embodiments, the ends of the axel 660 can be inserted into the outer layer 915. The axel 660 is preferably cylindrical but can be formed in other shapes in other embodiments. The channels 655 in the top channel joints 650 are selected with dimensions to allow the struts associated with the jointed connection assemblies to move rotationally around the axel 660.

The jointed connection assembly 120 can comprise a device-side strut 121 which can comprise two legs, although as seen in profile in the elevation view of FIG. 9, only leg 205 can be seen. The top of leg 205 comprises a barreled port 215 which houses one end of an axel 124. Similarly, the top of leg 206 comprises a barreled port 216 that houses the other end of axel 124, but as illustrated in profile in the elevation view of FIG. 9, cannot be seen. The bottom of each of legs 205 and 206 is connected to c-clamp 210, that is used to rotatably engage the jointed connection assembly 120 to the device connecting assembly 105.

The finger-side strut 122 can comprise a single leg 225 with c-clamp 126 formed on one end and c-clamp 220 formed on the other end. The c-clamp 126 engages with axel 124. The c-clamp 220 is configured to rotatably engage the jointed connection assembly 120 to the finger gripping assembly 110.

The jointed connection assembly 120 is configured so that the single leg 225 can rotate into a position between leg 205 and leg 206 when the c-clamp 126 rotates around axel 124. This configuration allows the jointed connection assembly to have a very low profile when it is in a fully flexed position.

The jointed connection assembly 130 can comprise a device-side strut 131 can comprise two legs, although as seen in profile in FIG. 9, only leg 255 can be seen. The top of leg 255 comprises a barreled port 265 which houses one end of axel 134. Similarly, the top of leg 256 comprises a barreled port 266 that houses the other end of axel 134. The bottom of each of legs 255 and 256 is connected to c-clamp 260, that is used to rotatably engage the jointed connection assembly 130 to the device connecting assembly 105.

The finger-side strut 132 can comprise a single leg 275 with c-clamp 136 formed on one end and c-clamp 270 formed on the other end. The c-clamp 136 engages with axel 134, but as illustrated in profile in the elevation view of FIG. 9, cannot be seen. The c-clamp 270 is configured to rotatably engage the jointed connection assembly 130 to the finger gripping assembly 110.

It should be appreciated that the joints illustrated in the figures represent one possible embodiment. In other embodiments, other types of joints can be used. In other embodiments, more joints can be employed in each leg to provide additional potential orientations of the device. It should also be understood that in certain embodiments, the number of jointed connection assemblies and/or legs can be adjusted for additional applications. However, in such embodiments, the arrangements can be configured to facilitate large angle flexibility of the jointed connection assemblies and/or leg. The embodiments can be situated such that the jointed connection assemblies do not interfere with one another when flexed.

It should be noted that in the embodiments detailed herein, the jointed connection assemblies comprise three joints, that allow a variety of adjustments to the orientation of the system. It is of particular importance that when the centralized joint between the finger side strut and device side strut is adjusted inward, in a motion associated with the retraction of the finger gripping assembly 110 toward the device connecting assembly 105, the single finger side strut folds between the two device side struts, which increases the effective angular relationship between the respective section of the struts to a full 180 degrees (i.e. the struts of the arms are substantially parallel to one another). This provides the ability for the device grip 100 to be retracted into a flat configuration.

In FIG. 9, the device connecting assembly 105 can comprise a bottom base 405 and an upper base 410. The bottom base 405 can be engaged to the upper base 410 to form the completed device connecting assembly 105.

The bottom base 405 comprises a base structure 415 with a peg 420 formed thereon. The peg 420 includes a lip 425 on its upper rim. In certain embodiments, the base structure 415 can be circular, and the peg 420 can similarly comprise a tubular structure, such that the upper base 410 can rotate around bottom base 405.

The bottom base 405 can be connected to the orifice 435 of the annular structure 430 of the upper base 410. Specifically, the peg 420 is configured to fit in the orifice 435 of the annular structure 430. The peg 420 engages with the annular structure 430 to form the device connecting assembly 105. The lip 425 on the peg 420 can fit with a similarly configured extrusion 440 in the rim 445 of the orifice 435 of the annular structure 430. When the lip 425 of the peg 420 is engaged in the extrusion 440 of the rim 445, the connection is less likely to be accidentally jostled apart.

The upper base 410 further comprises at least one channel joint 450. The channel joint 450 can include a channel 455 with an axel 460 formed therein. In FIG. 4, two such channel joints 450 are illustrated, but in other embodiments, more or fewer channel joints 450 can be used. The axel 460 is configured to interface with c-clamp 210 or c-clamp 260. The channel joints 450 allow the radial adjustment of the jointed connection assemblies 120 and 130 via rotation of c-clamp 210 or c-clamp 260 around axel 460.

Figure 10:
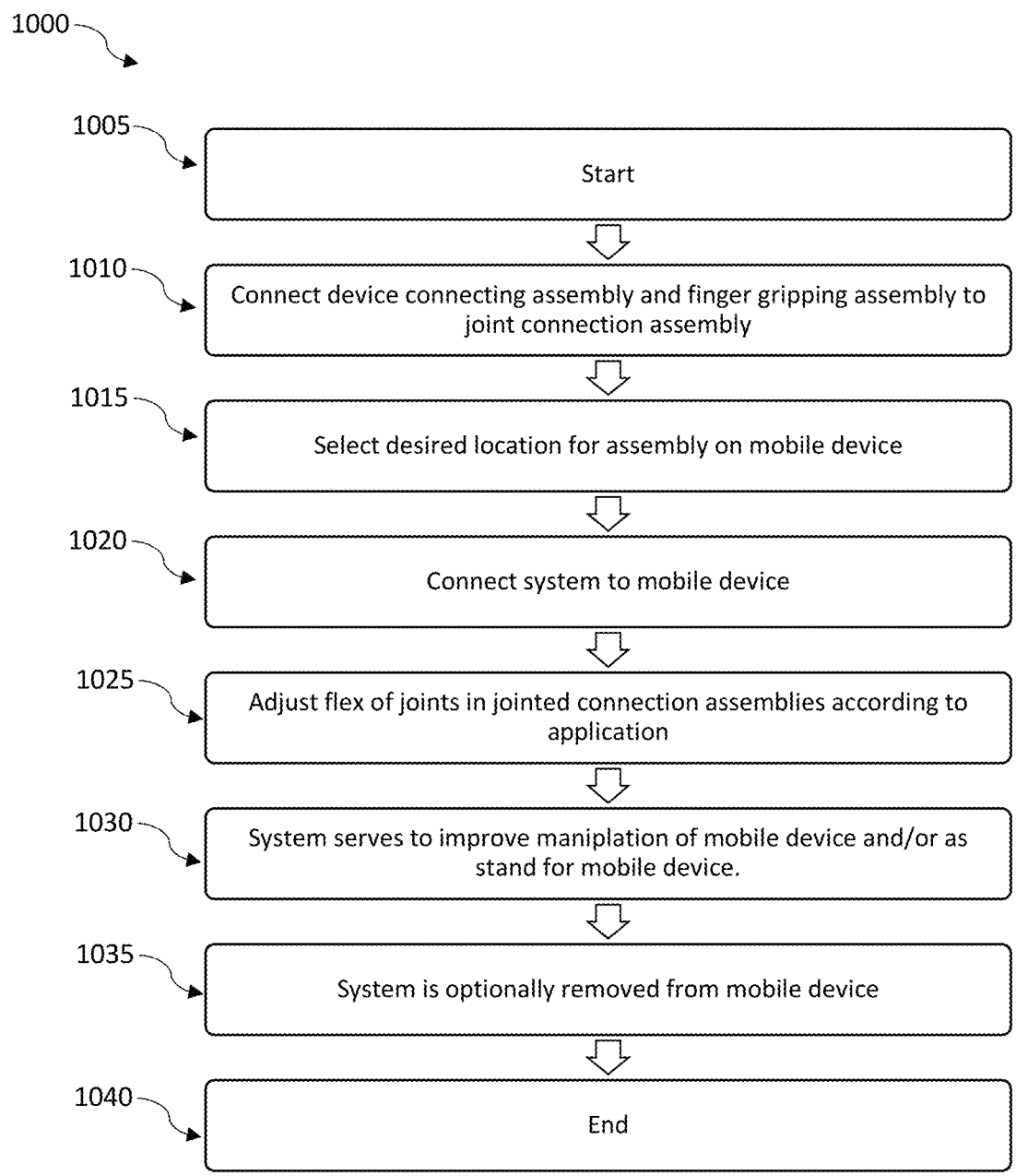
FIG. 10 depicts a flow chart of steps associated with an exemplary method of providing an improved grip on a mobile device, in accordance with the disclosed embodiments.

FIG. 10 illustrates a method 1000 for providing improved grip of a mobile device in accordance with the disclosed embodiments. The method begins at 1005. Initially at step 1010, the device can be assembled. This can include connecting the middle joint of each device connecting assembly, and then popping the c-clasps at each end of the device side struts onto the axels of the device side assembly and popping the c-clasps at the end of the finger gripping struts, to the finger gripping assembly respectively.

Once the device is assembled, at step 1015 the user can select where to attach the device gripping system to a mobile device. This can include connecting the assembly to the mobile device itself, or the case of a mobile device. Positioning of the assembly may depend on its application (e.g. as a hand hold, as a stand, or in anticipation of both such uses, etc.).

Once a preferred location has been selected, at step 1020, the system can be connected to the mobile device. In some embodiments, the outer surface of the device connection assembly can be coated with a connective substance such as stick'em, semi-permanent glue, epoxy, double-sided tape or the like. The connective substance can be covered by a protective film. In order to install the device, the film can be removed, exposing the connective substance underneath. The system can then be engaged to a mobile device, or other such device at the desired location.

In other embodiments, the outer surface of the device connection assembly can be a suction cup or other such device to facilitate fixed engagement with the mobile device. In such embodiments. The device can be pressed against the mobile device to create a negative pressure differential to facilitate the connection.

Once the apparatus is installed on the mobile device, the jointed connection assemblies of the system can be extended or retracted according to the desired application, as shown at step 1025. For example, the struts can be extended to allow the user to grasp the device with their hand. The orientation of the mobile device can be adjusted, as shown at step 1030, in numerous ways by adjusting the flex in one or more of the struts of the system, and or rotation of the system. For transportation or storage, the jointed connection assemblies of the system can be adjusted to retract the finger gripping assembly to the mobile device. If the system is being used as a stand for the mobile device, the struts can be adjusted to provide a desirable viewing angle of the mobile device. It should be appreciated that these steps can be repeated indefinitely as the application of the system changes in accordance with the use of the mobile device. In this way the system serves to improve the ability to manipulate the mobile device.

In certain embodiments, the apparatus can also, optionally be removed from the device if necessary as shown at step 1035. This may be so that the system can be connected to a different mobile device, repositioned on the same mobile device, or for other reasons. At this point, the method ends at step 1040.

Figure 11A:
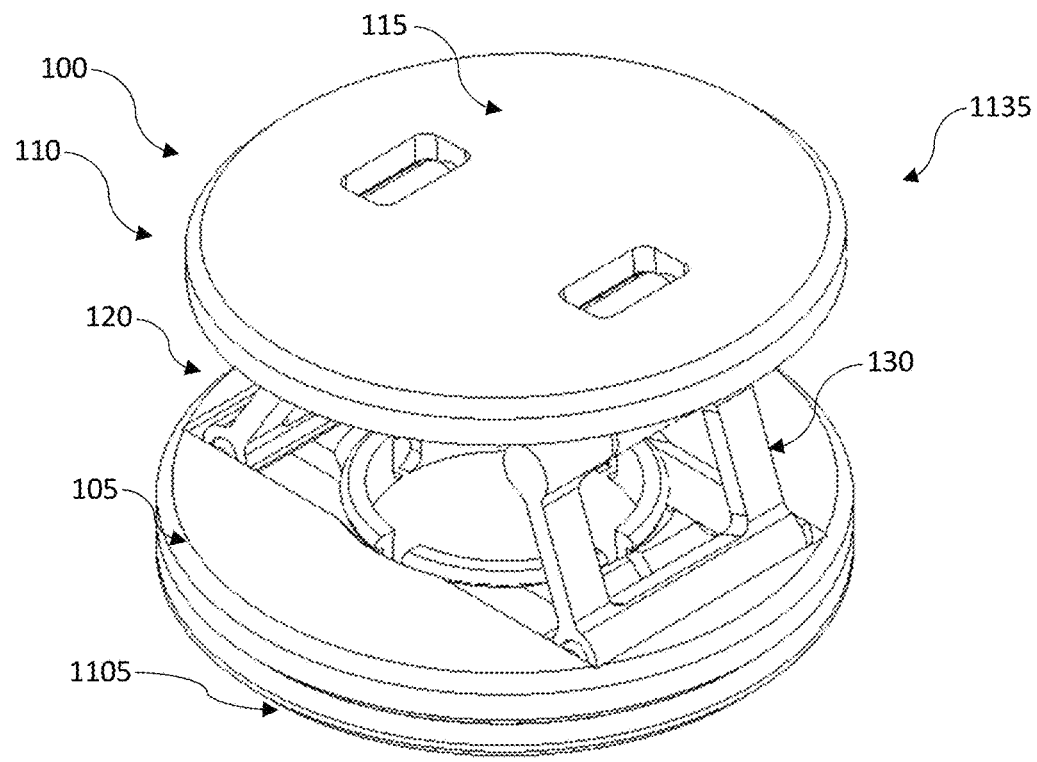
FIG. 11A depicts a phone gripping assembly, in accordance with the disclosed embodiments.
Figure 11B:
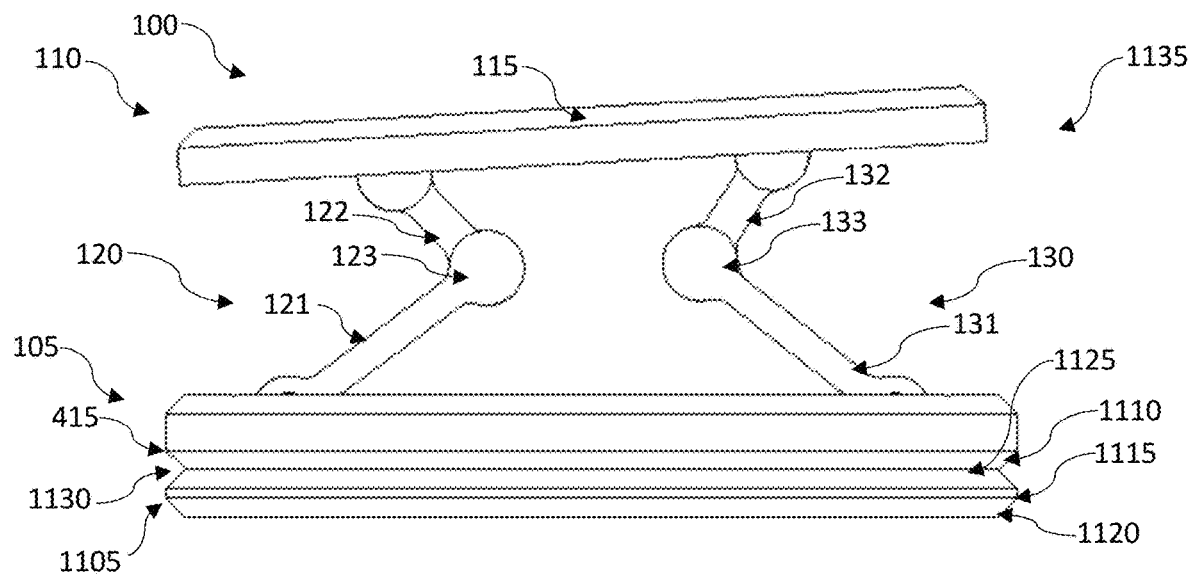
FIG. 11B depicts a phone gripping assembly, in accordance with the disclosed embodiments.
Figure 11C:
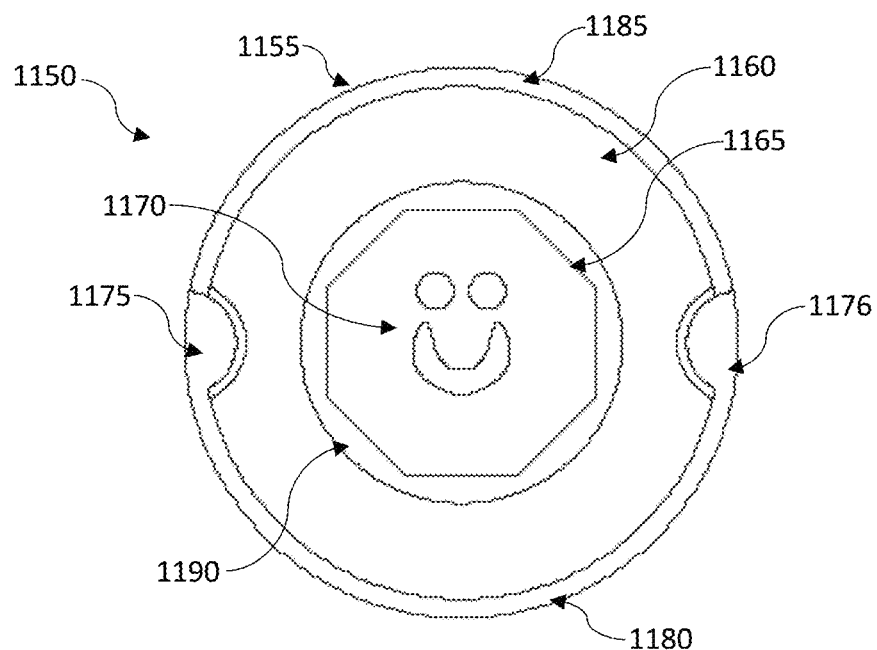
FIG. 11C depicts a vehicle mount, in accordance with the disclosed embodiments.
Figure 11D:
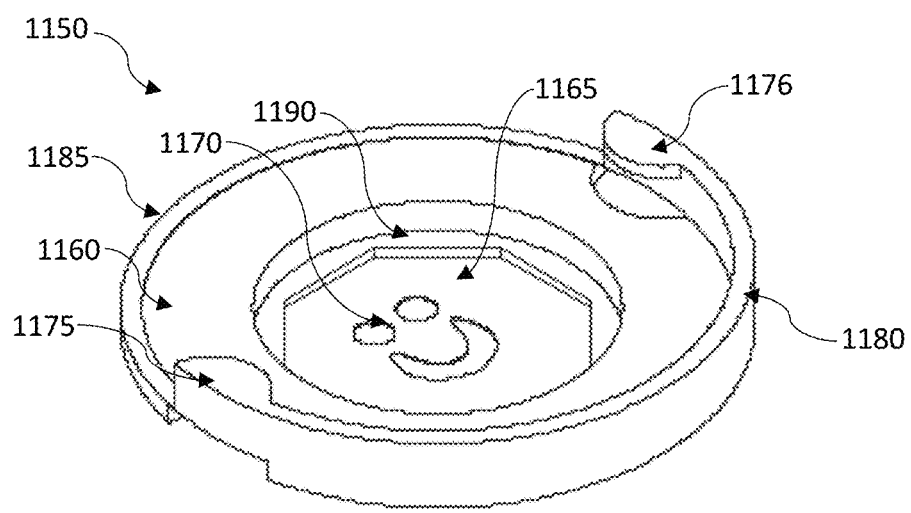
FIG. 11D depicts a vehicle mount, in accordance with the disclosed embodiments.

FIGS. 11A-11D, illustrate a car mounted connection system 1100 in accordance with the disclosed embodiments. The car mounted connection system 1100 can comprise two basic aspects. The first is a device grip such as device grip 100 or device grip 700, with an additional mount support lip as illustrated in FIG. 11A and FIG. 11B as phone gripping assembly 1135. The second aspect is a vehicle mount 1150 as illustrated in FIG. 11C and FIG. 11D.

Thus, the car mounted connection system 1100 can include connecting assembly 105 configured for attaching to an external device such as a smartphone, mobile phone, tablet device, mobile device case, or other such device. The device connecting assembly 105 can be connected to a finger gripping assembly 110 via one or more jointed connection assemblies, illustrated as jointed connection assembly 120 and jointed connection assembly 130 in FIG. 1. The finger gripping assembly 110 generally includes a rigid or semi-rigid platform 115 that can be easily engaged in, between, and/or over, a user's hands or fingers. In certain embodiments, at least one of jointed connection assembly 120 and jointed connection assembly 130 can connect the device connecting assembly 105 and the finger gripping assembly 110.

Each of jointed connection assembly 120 and jointed connection assembly 130 can be mounted to the device connecting assembly 105 with joint 125 and joint 135 respectively. Joint 125 and joint 135 can comprise channel joints, as illustrated in FIG. 1.

The jointed connection assembly 120 can include a device-side strut 121 connected to finger-side strut 122 with a leg joint 123. The leg joint 123 can comprise a cylindrical axel 124 associated with the device-side strut 121, engaged by a c-clamp 126 extending from the finger-side strut 122. The top of the finger-side strut 122 can connect to the finger gripping assembly 115 with a channel joint formed on the bottom surface of the finger gripping assembly.

The jointed connection assemblies, illustrated in FIG. 11A and FIG. 11B are configured to move independently from one another, in order to facilitate adjustment of the orientation of the finger gripping assembly 110 with respect to the device connecting assembly 105. The orientation of the finger gripping assembly 110 allows the viewing angle of the device connected to the device connecting assembly 105 to be adjusted.

The device connecting assembly 105 can be configured to include a car mounting lip 1105. The base structure 415 can include an inward tapering lower layer 1110. The car mounting lip 1105 can comprise a top layer 1125 that has an outward tapering slant, where the top of the top layer 1125 is connected to the inward tapering lower layer 1110 of the base structure 415. In certain embodiments, the mounting lip 1105 can be fixedly engaged to the base structure 415. In other embodiments, the mounting lip 1105 can be mounted to the base structure 415 with a sticky upper surface.

In certain embodiments, the car mounting lip can have a middle layer 1115. The diameter of the middle layer 1115 can have a diameter equal to, or slightly greater than the diameter of the base structure 415. The inward tapering lower layer 1110 and the top layer 1125 connection can form a recess 1130. The middle layer 1115 is connected on its opposing side to the outside surface 1120. This arrangement forms the car mounting lip 1105.

The vehicle mount 1150 comprises a base 1155. The base 1155 further includes a top ring 1160, the inner void of the top ring 160 defines an inner platform 1190, that is further connected to the vehicle interface layer 1165. The opposing side of the vehicle interface layer 1165 can have a connecting layer (not shown) that can comprise a high strength adhesive or other such sticky surface, such that the vehicle mount 1150 can be engaged to a surface in a vehicle. The interface layer 1165 can further include an ornamental design 1170 configured thereon.

The vehicle mount 1150 further includes a retention lip 1180. The retention lip 1180 can comprise a raised lip that extends above the top ring 1160 and around the lower half circumference of the vehicle mount 1150. The ends of the retention lip 1180 have a retention tab 1175 on one end, and another retention tab 1176 on the other end of the retention lip 1180. The recess 1130 associated with the mounting lip 1105 is configured to allow the phone gripping assembly 1135 to engage to the vehicle mount 1150, by sliding the phone gripping assembly 1135 into the vehicle mount 1150. The upper half of the circumference of the vehicle mount can have a lip 1185.

The car mounted connection system 1100 allows a user to connect the vehicle mount 1150 to an external surface, such as, most commonly, an interior surface in a vehicle to facilitate hands free driving. With the vehicle mount 1150 installed, the phone gripping assembly 1135 can be engaged to the vehicle mount by sliding the recess 1130 past the tabs 1175 and 1176. The car mounting lip 1105 can rest on the lip 1180, with the tabs 1175 and 1176 holding the phone gripping assembly 1135 in place.

Based on the foregoing, it can be appreciated that a number of embodiments, preferred and alternative, are disclosed herein. For example, in an embodiment an apparatus comprises a device connecting assembly, a finger gripping assembly, and at least one jointed connection assembly connecting the device connecting assembly and the finger gripping assembly.

In an embodiment, the device connecting assembly comprises an upper base with an orifice formed therein, a bottom base, and a peg formed on the bottom base. In an embodiment, the device connecting assembly comprises a rigid base, a grip layer, and a snap swivel connection between said rigid base and said grip layer. In an embodiment, the device connecting assembly comprises a connective material formed on a bottom base. In an embodiment, the device connecting assembly comprises at least one channel joint. In an embodiment, the finger gripping assembly further comprises at least one top channel joint.

In an embodiment, the at least one jointed connection assembly comprises a device side strut, a finger side strut, and a leg joint connecting said device side strut to said finger side strut. In an embodiment, the device side strut further comprises two legs connected by an axel and a c-clamp connected to each of the two legs. In an embodiment, the finger side strut further comprises a leg, a first c-clasp connected to one end of the leg, and a second c-clasp connected to another end of the leg. In an embodiment, the finger side strut is configured to fold between two legs of the device side strut.

In an embodiment, An apparatus comprises a device connecting assembly comprising a rigid base connected to a grip layer, and at least one channel joint, a finger gripping assembly comprising at least one top channel joint, and at least one jointed connection assembly comprising at least one device side strut connected to at least one finger side strut with a leg joint, wherein the jointed connection assembly connects to the at least on channel joint and the at least one top channel joint.

In an embodiment, the apparatus further comprises the rigid base comprises a device case. In an embodiment, the apparatus further comprises a peg formed on the device case wherein the peg connects to an orifice in the grip layer. In an embodiment, the apparatus further comprises a snap swivel connection between the rigid base and grip layer. In an embodiment, the apparatus further comprises a rivet swivel connection between the rigid base and grip layer.

In yet another embodiment, a system comprises a device connecting assembly comprising a rigid base and at least one channel joint, a finger gripping assembly comprising at least one top channel joint, and at least one jointed connection assembly wherein the jointed connection assembly connects to the at least on channel joint and the at least one top channel joint.

In an embodiment, the system further comprises at least one of a snap swivel connection between the rigid base and a grip layer and a rivet swivel connection between the rigid base and the grip layer. In an embodiment, the system further comprises a magnet formed in the finger gripping assembly.

In an embodiment, the system further comprises a phone gripping assembly and a vehicle mount. In an embodiment, the phone gripping assembly further comprises a car mounting lip connected to the rigid base.

It will be appreciated that variations of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. An apparatus comprising:
   a device connecting assembly further comprising:
     a first channel formed in an upper base;
     a first axel formed in the first channel;
     a second channel formed in the upper base;
     a second axel formed in the second channel;
   a finger gripping assembly further comprising:
     a first finger side channel formed in a finger interface layer;
     a first finger side axel formed in the first finger side channel;
     a second finger side channel formed in the finger interface layer; and
     a second finger side axel formed in the second finger side channel; and
   a first jointed connection assembly connecting the device connecting assembly and the finger gripping assembly, wherein the first jointed connection assembly comprises:
     a first bottom c-clamp configured to engage the first axel formed in the first channel;
     two legs connected to the first bottom c-clamp;
     a first axel joint connected between the two legs connected to the first bottom c-clamp; and
     a first finger side strut configured with a top c-clamp on one end and a lower c-clamp on another end, wherein the top c-clamp is configured to engage the first finger side axel and the lower c-clamp is configured to engage the first axel joint between the two legs connected to the first bottom c-clamp; and
   a second jointed connection assembly connecting the device connecting assembly and the finger gripping assembly, wherein the second jointed connection assembly comprises:
     a second bottom c-clamp configured to engage the second axel formed in the second channel;
     two legs connected to the second bottom c-clamp;
     a second axel joint connected between the two legs connected to the second bottom c-clamp; and
     a second finger side strut configured with a second top c-clamp on one end and a second lower c-clamp on another end, wherein the second top c-clamp is configured to engage the second finger side axel and the second lower c-clamp is configured to engage the second axel joint between the two legs connected to the second bottom c-clamp.

2. The apparatus of claim 1 wherein the device connecting assembly comprises:
   an orifice formed in the upper base;
   a bottom base; and
   a peg formed on the bottom base.

3. The apparatus of claim 1 wherein the device connecting assembly comprises:
   a rigid base;
   a grip layer; and
   a snap swivel connection between said rigid base and said grip layer.

4. The apparatus of claim 1 wherein the device connecting assembly comprises:
   a connective sticky material formed on a bottom base.

5. The apparatus of claim 1 wherein the first jointed connection assembly is configured to pivot inwardly and outwardly at the first axel joint connected between the two legs connected to the first bottom c-clamp, and wherein the second jointed connection assembly is configured to pivot inwardly and outwardly at the second axel joint connected between the two legs connected to the second bottom c-clamp.

6. The apparatus of claim 1 wherein the first finger side strut is configured to fold between the two legs connected to the first bottom c-clamp, and the second finger side strut is configured to fold between the two legs connected to the second bottom c-clamp.

7. An apparatus comprising:
   a device connecting assembly comprising a rigid base connected to a grip layer, a first channel joint formed in the grip layer and a second channel joint formed in the grip layer;
   a finger gripping assembly for gripping a user's finger between the finger gripping assembly and the device connecting assembly, the finger gripping assembly including comprising a first top channel joint and a second top channel joint;
   a first jointed connection assembly comprising a first device side strut connected to a first finger side strut with a first leg joint, wherein the first device side strut connects to the first channel joint and the first finger side strut connects to the first top channel joint, a second jointed connection assembly comprising a second device side strut connected to a second finger side strut with a second leg joint, wherein the second device side strut connects to the second channel joint and the second finger side strut connects to the second top channel joint, wherein the second finger side strut is configured to fold between two legs associated with the second device side strut at the second leg joint wherein the first device side strut comprises two legs with no connection along their central sections so as to create an open channel through the device side strut, such that the first finger side strut can fold between and beyond the two legs in either direction.

8. The apparatus of claim 7 wherein the rigid base comprises a device case.

9. The apparatus of claim 8 further comprising:
a peg formed on the device case wherein the peg connects to an orifice in the grip layer.

10. The apparatus of claim 8 further comprising:
a snap swivel connection between the rigid base and the grip layer.

11. The apparatus of claim 8 further comprising:
a rivet swivel connection between the rigid base and the grip layer.

12. A system comprising:
a device connecting assembly comprising a rigid base and a first channel joint formed in the rigid base and a second channel joint formed in the rigid base;
a finger gripping assembly comprising a first top channel joint and a second top channel joint;
a first jointed connection assembly comprising a first device side strut connected to a first finger side strut with a first leg joint, wherein the first device side strut connects to the first channel joint and the first finger side strut connects to the first top channel joint; and
a second jointed connection assembly comprising a second device side strut connected to a second finger side strut with a second leg joint, wherein the second device side strut connects to the second channel joint and the second finger side strut connects to the second top channel joint, wherein the second finger side strut is configured to fold between two legs associated with the second device side strut at the second leg joint wherein the first device side strut comprises two legs with no connection along their central sections so as to create an open channel through the device side strut, such that the first finger side strut can fold between and beyond the two legs in either direction.

13. The system of claim 12 further comprising at least one of:
a snap swivel connection between the rigid base and a grip layer; and
a rivet swivel connection between the rigid base and the grip layer.

14. The system of claim 12 further comprising:
a magnet formed in the finger gripping assembly.

15. The system of claim 14 further comprising:
a car mounting lip connected to the rigid base; and
a vehicle mount.

16. The system of claim 15 wherein the car mounting lip further comprises:
an inward tapering lower layer; and
a top layer that has an outward tapering slant, wherein a top of the top layer is connected to the inward tapering lower layer forming a recess.

* * * * *